United States Patent [19]

Beaupère

[11] Patent Number: 4,586,261
[45] Date of Patent: May 6, 1986

[54] UNIVERSAL DIMENSIONAL GAUGE TABLE FOR INNER AND OUTER MEASURES

[75] Inventor: René Beaupère, Montbrison, France

[73] Assignee: Beaupere S.a.r.l., Z.I. des Granges, Montbrison, France

[21] Appl. No.: 565,694

[22] Filed: Dec. 27, 1983

[30] Foreign Application Priority Data

Dec. 31, 1982 [FR] France .................................. 82 22240
Apr. 19, 1983 [FR] France .................................. 83 06349

[51] Int. Cl.⁴ ............................................... G01B 5/12
[52] U.S. Cl. ..................................... 33/147 E; 33/555
[58] Field of Search .............. 33/147 E, 14 R, 147 K, 33/143 M, 143 R, 147 R, 550, 555

[56] References Cited

U.S. PATENT DOCUMENTS

| | | |
|---|---|---|
| 2,216,796 | 10/1940 | Aller .................................. 33/147 K |
| 2,607,123 | 8/1952 | Sheridan . |
| 2,911,725 | 11/1959 | Sleigh . |
| 3,346,964 | 10/1967 | Schiller et al. ..................... 33/147 E |
| 4,128,943 | 12/1978 | Muhlethaler ....................... 33/147 E |
| 4,208,796 | 6/1980 | Michaud et al. ................... 33/147 E |
| 4,280,278 | 7/1981 | Forsman ............................. 33/147 E |

FOREIGN PATENT DOCUMENTS 251428 8/1948 Switzerland ..................... 33/143 M

*Primary Examiner*—William D. Martin, Jr.
*Attorney, Agent, or Firm*—Browdy and Neimark

[57] ABSTRACT

A centering of the fixed key is obtained by means of its support, a perfect locking of the support of the fixed key is obtained by a key wedge, a displacement of the mobile key is obtained by the assembly of the square shaped support, the mobile pin is fixed thereto and the fixed pin secured to the body and parallel to the mobile pin, a displacement is provided through three ball bearings, a first ball bearing being housed in the support and two ball bearings in the wall of the body, then two protecting caps are secured on the body for outerly protecting the two ends of the mobile pin.

17 Claims, 51 Drawing Figures

Fig. 43
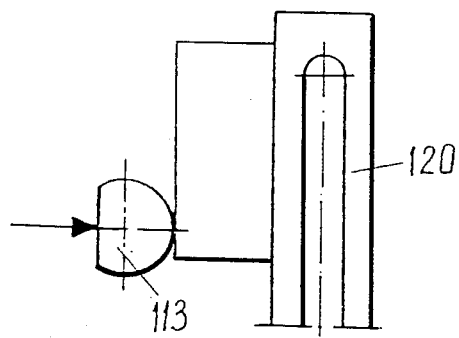
Fig. 44
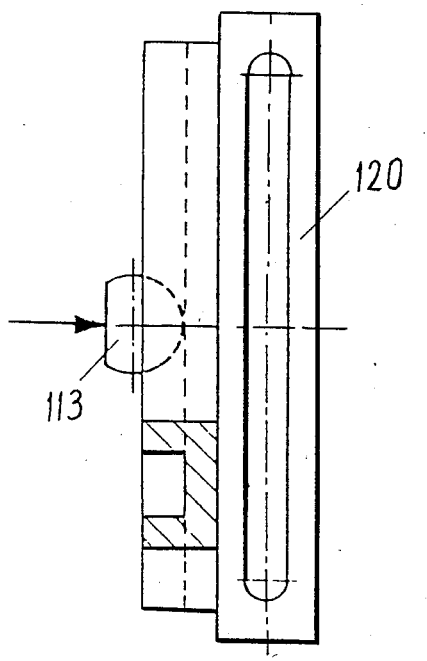
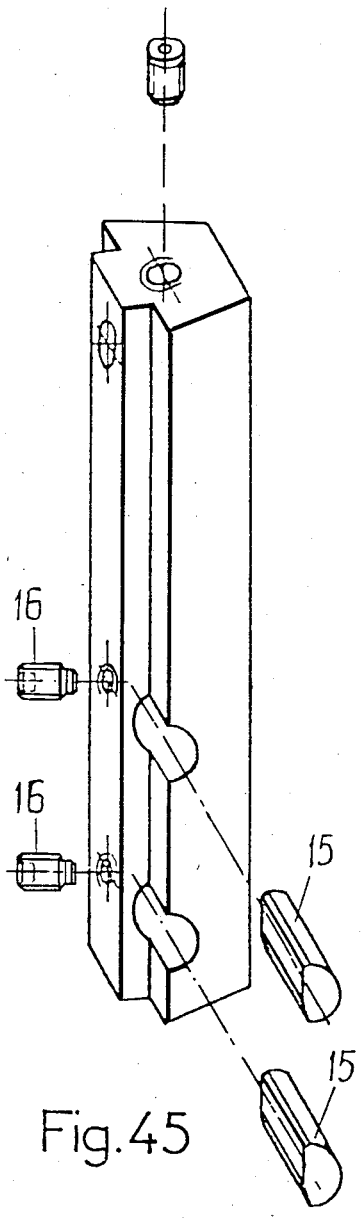
Fig. 45

UNIVERSAL DIMENSIONAL GAUGE TABLE FOR INNER AND OUTER MEASURES

FIELD OF THE INVENTION

The present invention relates to an universal dimensional gauge table for measuring inner and outer dimensions by comparing various parts after a predetermined calibration.

BACKGROUND OF THE INVENTION

The dimension to be verified is measured by a spacing of a fixed key with respect to mobile key.

Such an apparatus can be used for a plurality of subcontracting activities, such as mechanics, screwcutting, machining on digital gauge machines, stamping, swaging, for example, for which a quality has to be the most economically ensured during making a part and with a sufficient accuracy in order not to be an obstacle to competitivity.

The multiplicity of the verifications that this type of apparatus makes possible is particularly economical by enabling to obviate the use of gauges and measuring tools of any types which are provided for a single given dimension and which can be rapidly worm, as well as the use of a plurality of various verifying apparatus which are each one provided only for one type of measure and sometimes for a reduced dimensional range (slide calipers, micro-measurers of inner and outer diameters, micro-measurers of outer grooves, micro-measurers of inner and outer threads, etc.), thereby the interest of such an apparatus when the part to be verified has a plurality of shapes and are made in series of median or small ranges.

OBJECTS AND SUMMARY OF THE INVENTION

The apparatus of the invention enables amoung other a verification of the following measures: inner diameters and outer diameters, even if they are of a difficult access, diameters of recesses of a small depth (from 1 mm depth), diameters of inner grooves and outer grooves even of small dimensions, inner and outer diameters of front grooves, even when they have a small width and when the part is of a small or great dimensions, concentricity of an inner diameter with respect to an outer diameter, concentricity between two outer or inner diameters conicity, inner and outer threadings, thickness of thin metal walls between an outer diameter and an inner diameter, length, parallelism of two surfaces, thicknesses of the bottom of linear grooves, depth of linear slots, width of T-shaped linear slots, length between axes.

In conventional apparatus of this type which can make some multiplicity of verifications, some of the apparatus are rustic and are not very precise but they can be sufficiently accurate during working steps; oppositely other apparatus are very elaborated with a high accuracy and are very costly but a climatized atmosphere is necessary for using them without losing their high performances even if these high performances are often useless for activities in question.

The gauge apparatus of the present invention can be used in a work-shop because of its hardiness; it has a good accuracy for activities in question and a noticeable repeatability due to the various processes the apparatus carries jointly into effect.

According to the invention, the universal dimensional gauge table for inner and outer measures enabling to verify a dimension by turning back between a fixed key and a mobile key by comparing with a predetermined calibration is characterized in that:

(a) centering of the fixed key, the axis of the fixed key and that of the comparator having to be in a same plane, is obtained by means of its support, the lower part of which has a cross section in the shape of an inverted isoceles trapezium and lies on the slide of the body which has a same cross section but in recess;

(b) a perfect locking of the support of the fixed key is obtained by a key wedge having a cylindrical shape with a longitudinal flat part that a screw causes to pivot in a bore which crosses through the support by pressing on one of the sides of this flat part in such a manner that the other side will be wedged against the lower face of the measuring table;

(c) displacement of the mobile key which provides a perfect perpendicularity of the mobile key, and its perfect centering is obtained by the assembly of the square shaped support, the mobile pin which is fixed thereto and the fixed pin secured to the body and parallel to the mobile pin;

(d) displacement is provided through three ball bearings housed in the support and, for the ball bearings, in the wall of the body, then two protecting caps are fixed on the body for outerly protecting the two ends of the mobile pin.

Various other features of the invention will be revealed from the following detailed disclosure.

BRIEF DESCRIPTION OF THE DRAWINGS

Embodiments of the invention are shown as non limitative examples in the accompanying drawings wherein:

FIG. 43 shows a verification of the parallelism;

FIG. 44 shows a verification of thickness;

FIG. 45 shows a support for lengthened fixed keys;

DESCRIPTION OF PREFERRED EMBODIMENTS

Figure 1:
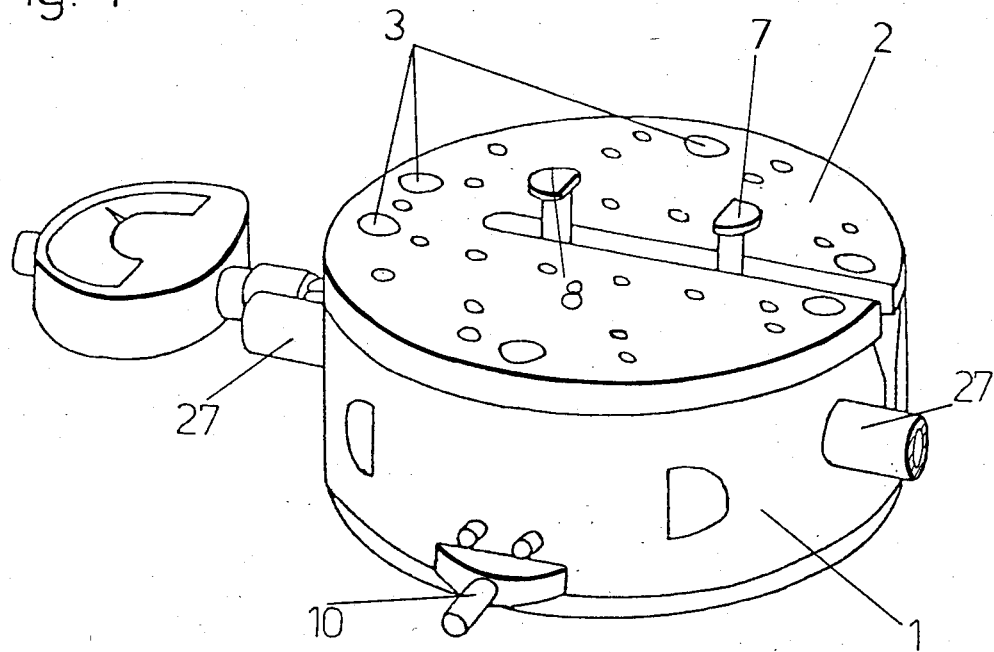
FIG. 1 is a perspective view of an apparatus according to the invention.
Figure 2:
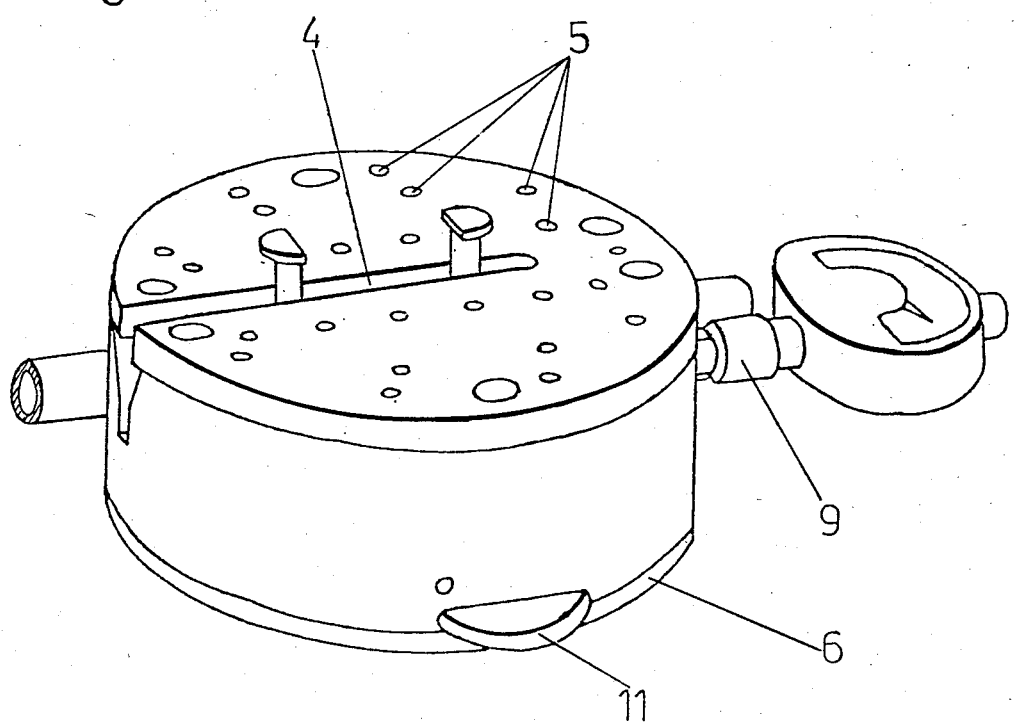
FIG. 2 is a perspective view of the apparatus seen on the other side of that shown in FIG. 1.

FIGS. 1 and 2 show outerly the apparatus which comprises a body 1 (of a cylindrical shape in the example as shown), a measuring table 2 secured on the body by means of six screws 3, having an aperture 4 according to about ¾ a diameter (for passing keys mentionned hereafter) and a series of twenty four innerly threaded holes 5 (suitably placed for fixing various accessories), a base 6 secured under the body 1 by means of four screws, a fixed key 7, a mobile key 8, a tightening clip 9 screwed in the body 1 for fixing a mechanical or electronical comparator, a handling fork 10 for the mobile key, and a serrated wheel 11 for inverting the movement of the mobile key. The movements of the mobile key 8 are transmitted through an anvil (fixed with the key 8) to the comparator.

Figure 3:
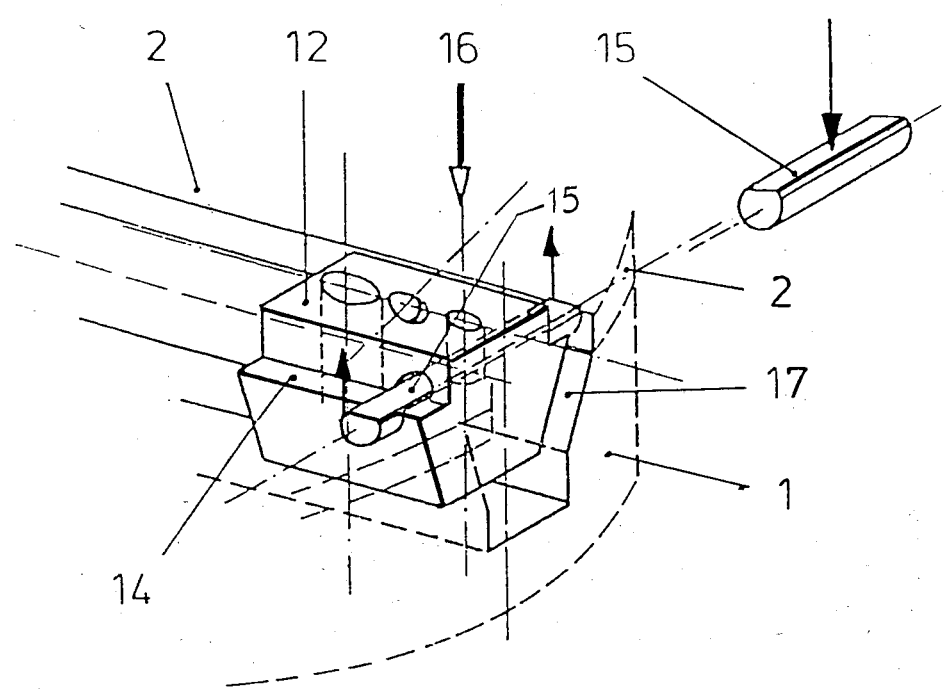
FIG. 3 is an enlarged perspective view of the locking device of the fixed key.
Figure 4:
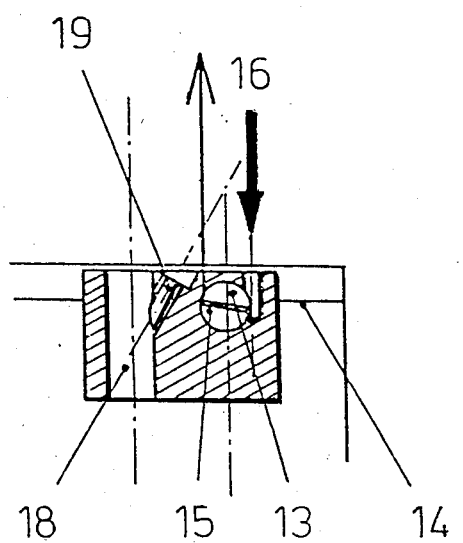
FIG. 4 is a cross-section of a part of FIG. 3.

The process for locking the fixed key with respect to the measuring table is shown in FIGS. 3 and 4 which show the different design of the support 12 for the fixed key which warrants not only a perfect centering of the key but also a perfect locking thereof.

The support 12 for the fixed key has a parallelepiped shape, the section of which is defined by a rectangle in its upper part and by an inverted isoceles trapezium in its lower part, which is in the axis of the rectangle and the great base of which is longer that the side of the rectangle and with which it is confounded.

The support 12 has a bore 13 perpendicular to its symmetry plane and which protrudes upwardly from the plane 14 defined by the great base of its trapezoidal section. In this bore is housed a key wedge 15 which is a cylinder having a longitudinal flat part at its upper part, the flat part being slightly lower that the plane 14. A screw 16 bearing on a side of the flat part makes the key wedge 15 to pivot on itself, the key wedge 15 of which the opposed side of the flat part, by pushing on the lower face of the measuring table 2, makes the support 12 to go down up to wedging of its lower part of an inverted trapezoidal cross-section with a slide 17 (which is a part of the body 1) of a similar cross-section. On the one hand, the force caused by the screw 16 enables a powerful locking of the support 12 and, on the other hand, the wedging of the two male and female elements of a same trapezoidal cross-section enables a perfect centering of the fixed key, the axis of the fixed key being in the same plane than the axis of the comparator.

The fixed key 7, housed in the bore 18, is secured in its support 12 by means of a screw, the end of which can be rounded or conical, this screw being mounted in an innerly threaded hole 19.

Figure 5:
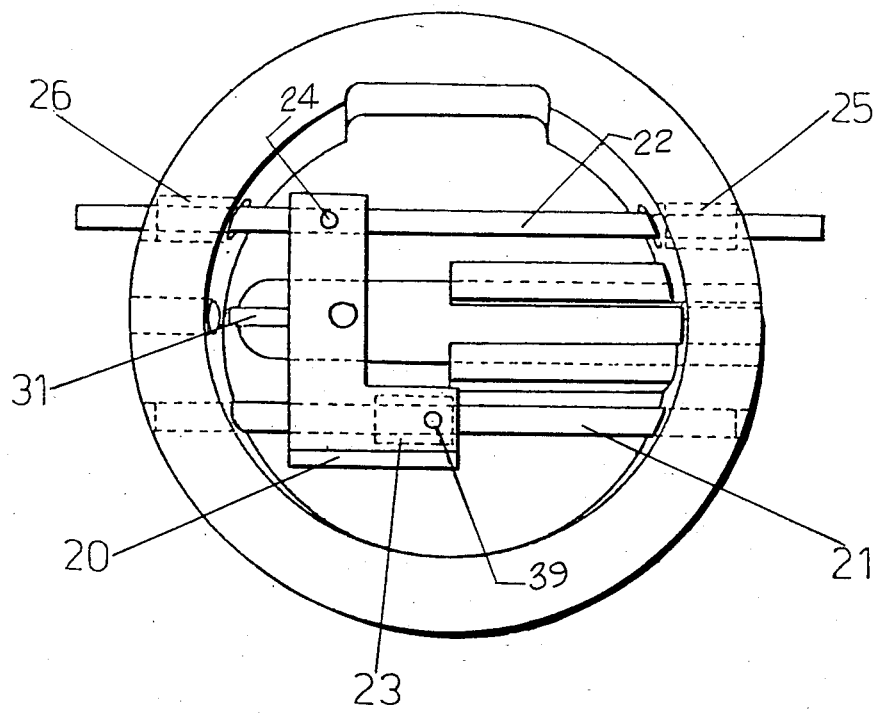
FIG. 5 is a view slightly in perspective showing a bottom view of the assembly carrying the mobile key of the apparatus.
Figure 6:
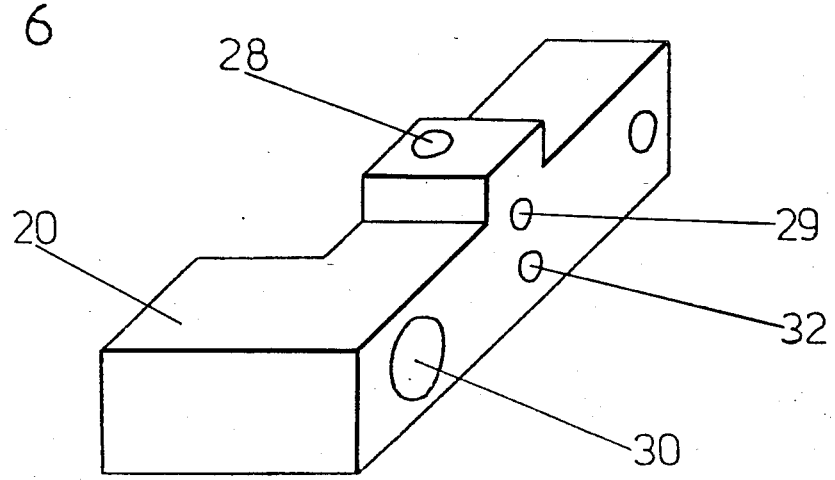
FIG. 6 is an enlarged perspective view of a part shown in FIG. 5.
Figure 7:
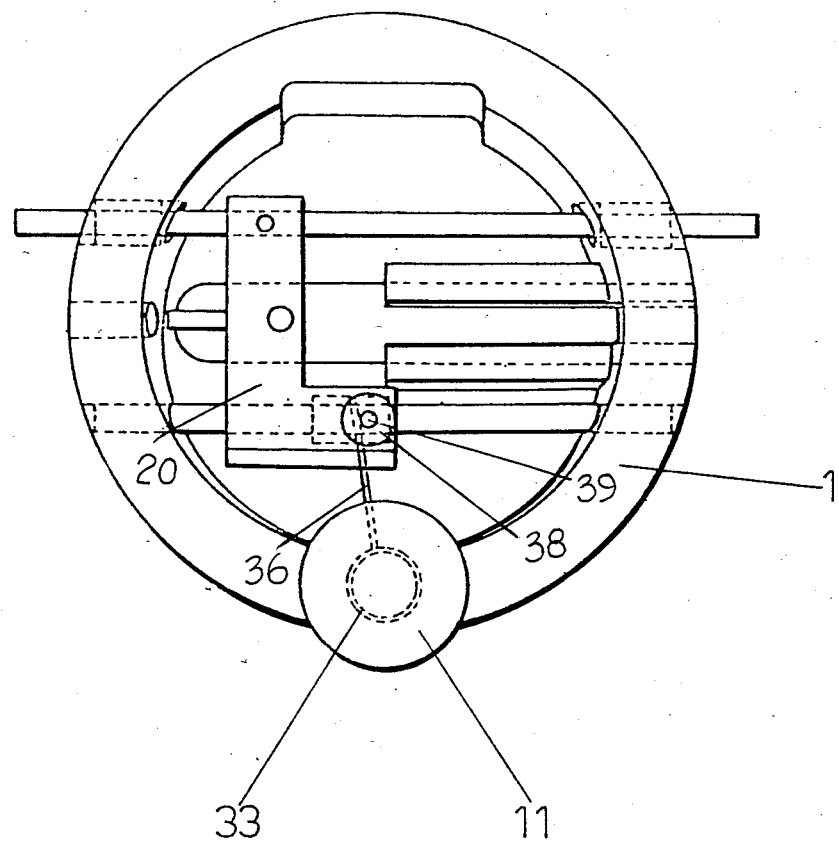
FIG. 7 is a view slightly in perspective showing a bottom view of the device permitting an adjustment of the palpation pressure and the inner-outer inversion of the stroke of the mobile key.
Figure 8:
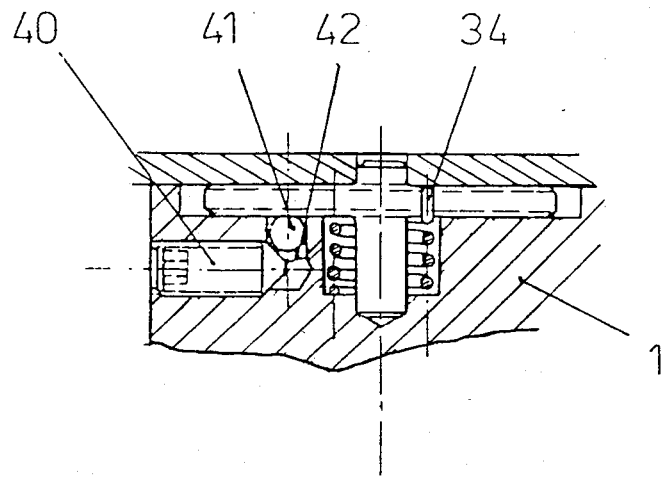
FIGS. 8, 9 and 10 are enlarged partial cross section views of the device, FIGS. 8 and 9 being cross-section views taken along lines A—A and B—B of FIG. 10.
Figures 9, 10:
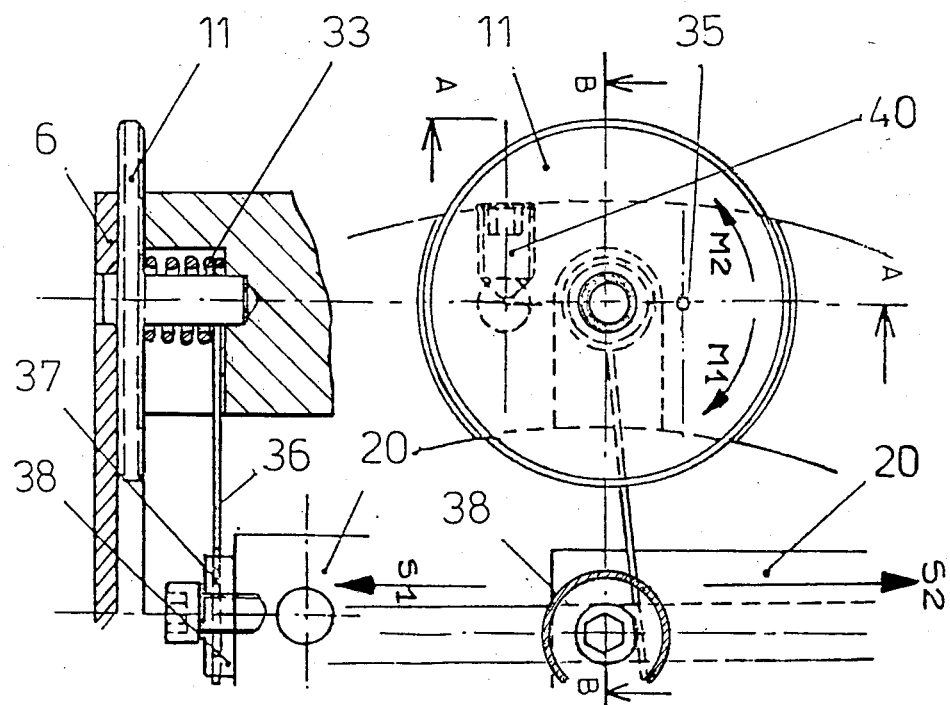

The mechanisme for displacing the mobile key shown in FIGS. 5 and 6 warrants the perfect sliding of the support assembly for the mobile key 8 and the perpendicularity of the mobile key 8, with an embodiment which is not costly.

The square-shaped support 20 of the mobile key 8 is guided for its displacement by two parallel pins 21, 22 which cross it, the pin 21 being fixed and the pin 22 being mobile with respect to the body 1.

When the support 20 is displaced, it slides by means of a bearing 23 on the fixed pin 21, and drives the mobile pin 22 which is fixed therewith through a screw mounted in the innerly threaded hole 24. The mobile pin 22 slides through opposed walls of the body 1 by means of two bearings 25 and 26. Displacement of the mobile key 8 is made through three bearings. For enabling a better smoothness of the displacement, and, consequently, a better contact sensibility of the mobile key 8 (thereby enabling a verification of fragile parts or parts having a thin wall or generally very deformable parts), the frictions are reduced at a minimum by means of the three bearings 23, 25 and 26 which are ball bearings without sealing gaskets or scraper-ring, the outer protrusions to the body 1 of the mobile pin 22 being protected by two caps 27 fixed to the body 1 (see FIG. 1).

The mobile key 8 is mounted in a calibrated hole 28 where it is locked by the screw 29. The ball bearing 23 is adjusted in the hole 30. The anvil 31 which transmits the movements of the mobile key to the comparator is screwed in the hole 32.

In FIGS. 7-10, there has been shown in a bottom view, the base 6 being withdrawn, the particular design of the serrated wheel 11 which enables not only and simultaneously to obtain an inversion of the movement for inner and outer measurements but also to depart from zero pressure and to increase progressively and regularly the pressure with a great easiness.

The inverting and adjusting serrated wheel 11, a sector of which protrudes outerly of the body 1 has two shoulders of inequal length used as rotation axis, a lower shoulder which is located in a hole of the base 6, and an upper shoulder which is covered by a twisting spring 33 having one end which is located in a blind hole of the wall of the body 1. The lower end 34 of the spring 33 which is vertical is located in a hole 35 of the serrated wheel 11 and the upper end 36 of the spring 33 which is horizontal is extended for crossing the hole 37 of the driving wheel 38 which is free to turn round its axis 39 which is fixed to the support 20 of the mobile key.

The gauge table being placed on its base, if the serrated wheel is turned in the direction M1, it draws progressively the spring 33, the horizontal end 36 of which drives the mobile support 20 in direction S1 under a progressively increasing force which is called the palpation pressure; and inversely if the serrated wheel is rotated in the other direction.

When the desired palpation pressure is obtained, the serrated wheel 11 is locked by screwing a needlescrew 40 which, forcing a ball 41 in its housing 42, will wedge the serrated wheel 11 between the serrated wheel 11 and the upper face of the base 6.

The serrated wheel 11 being thus adjusted, the mobile key is disengaged by means of the handling fork 10 (FIG. 1) for withdrawing the verified part and placing the following part, then by replacing progressively the handling fork 10 and under effect of the twisting spring 33, the mobile key comes into contact with the following part and under the desired palpation pressure.

Figure 11:
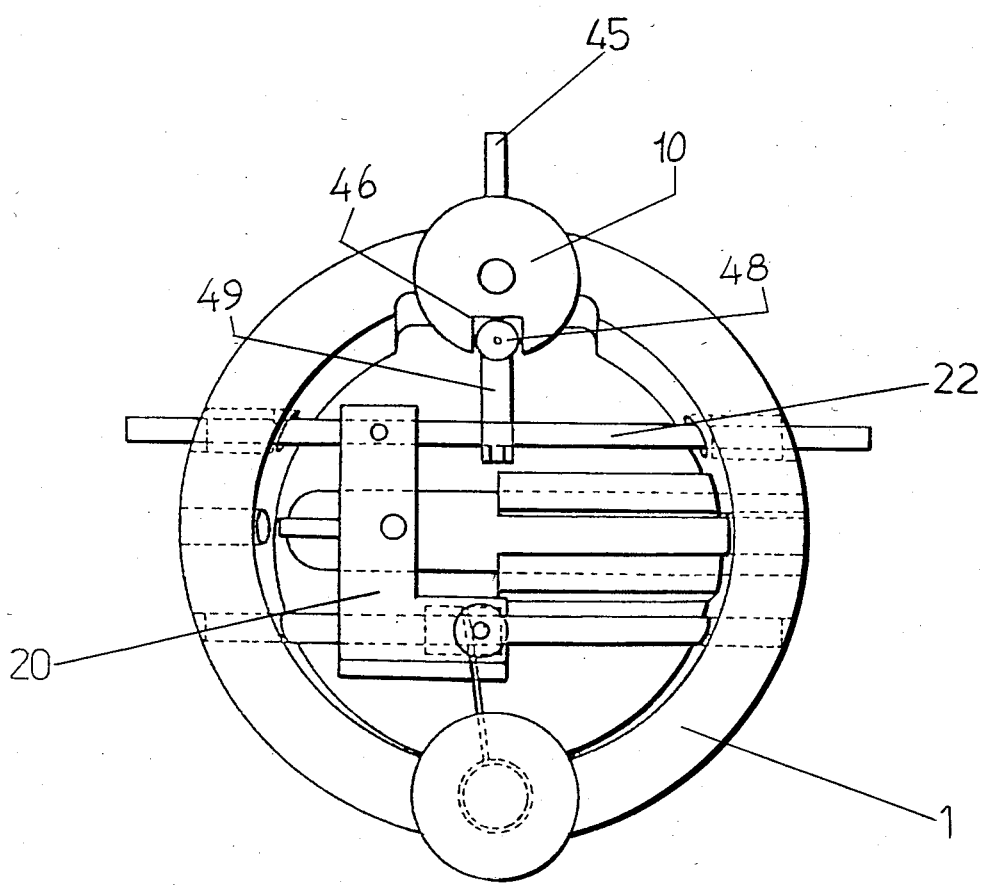
FIG. 11 is a view slightly in perspective showing a bottom view of the device permitting to handle the mobile key.
Figure 12:
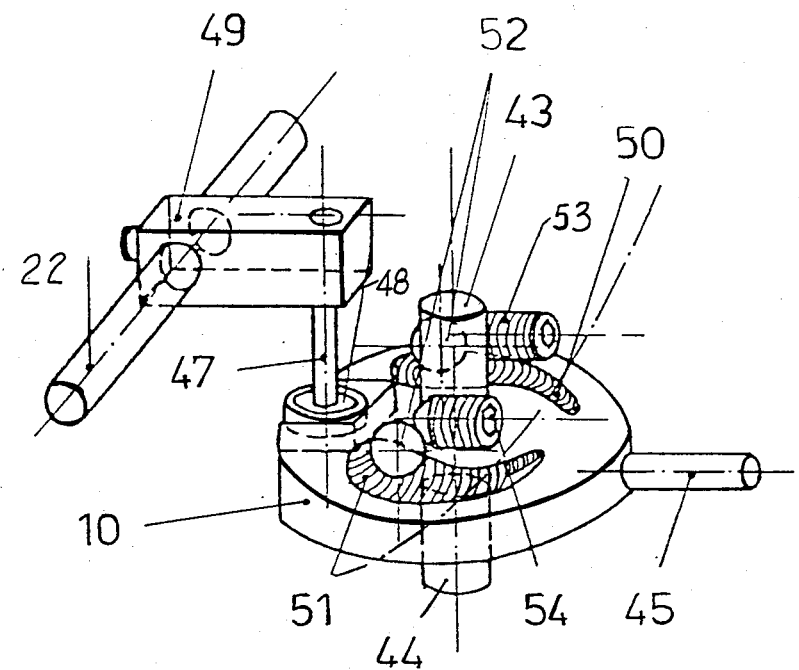
FIG. 12 is a perspective bottom view showing a first embodiment permitting to adjust the range of the stroke of the mobile key and its position in the keys and comparator plane.

Handling the mobile key, adjusting the amplitude of its stroke and of its place in the keys and comparator plane are obtained by means of devices shown in FIGS. 11 and 12.

Handling the mobile key 8 is controlled by the handling fork 10, the two parts 43 and 44 of the rotation axis of which are respectively located in a vertical hole of the wall of the body 1 and in a vertical hole of the base 6 (two vertical holes in which are positioned two ball bearings for a better facility of the handling), by acting on its handling finger 45 which protrudes outwardly. The forks 46, through a return finger 47, by acting on a roller of this finger 48 (mounted on ball bearings), displaces linearly a return means 49 since the return means 49 is fixed with the mobile pin 22 by driving the latter as well as the support of the mobile key 20.

In the first embodiment, the fork 10 has at its upper side two grooves 50 and 51 according to the same circle, symetrical and of an increasing depth of the handling finger 45 towards the fork 46, in which grooves 50 and 51 can bear to balls 52 located in two vertical blind holes of the wall of the body 1 with a possibility to more or less prodrude downwardly under action of two needle screws 53 and 54. The lower side of the fork being positioned against the upper side of the base 6, it is sufficient to act outwardly on the screws 53 and 54 in order that the balls, at a suitable level of the grooves will enable by wedging of the fork to determine the amplitude of the stroke of the mobile key and its place in the keys and comparator plane.

Figure 13:
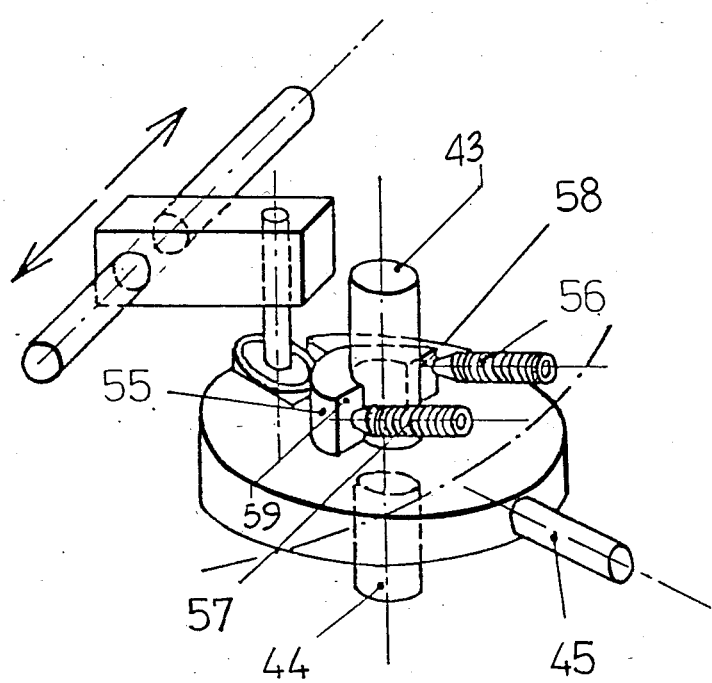
FIG. 13 is a perspective bottom view showing a variant of embodiment permitting to handle and adjust the amplitude of the mobile key as well as the place of its stroke in the keys and comparator plane.

In FIG. 13, the second embodiment is still simpler: the fork 10 is as in the preceeding embodiment but instead of the system formed by grooves, balls and needle screws, it has a semi-collar 55 which is integral with the fork 10 on the upper side thereof. It is therefore sufficient to adjust from outside the two screws 56 and 57 on the end of which will abut the two vertical planes 58 and 59 of the semi-collar 55 for determining the amplitude of the stroke of the mobile key and its place in the keys and comparator plane.

Figure 14:
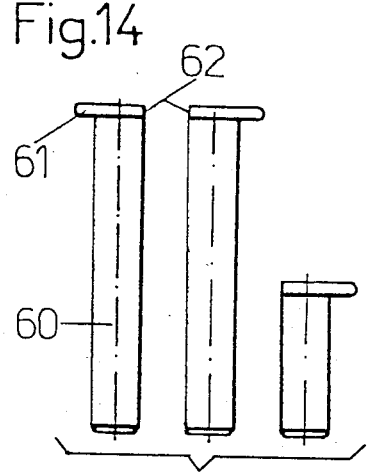
FIG. 14 is an elevation view of a set of three keys for the control of outer and inner diameters.

FIG. 14 shows a set of three keys each one made of a cylindrical shaft 60 and a palpation head 61 in the shape of a disc with a rounded edge. The later can be milled with a flat part 62 for increasing the capacity of the apparatus towards measuring smaller inner threadings. The smaller key is used in substitution of a longer key when the support for the fixed key 14 is locked in the other direction than that shown in FIG. 3 and at end of the table, i.e. above the wall of the body in order not to be impeded by the table. Therefore the capacity of the apparatus is increased towards measuring greater diameters. The first set enables to verify the measure of outer and inner diameters, inner and outer diameters of front grooves and a thickness of a thin wall between an outer diameter and an inner diameter.

Figure 15:
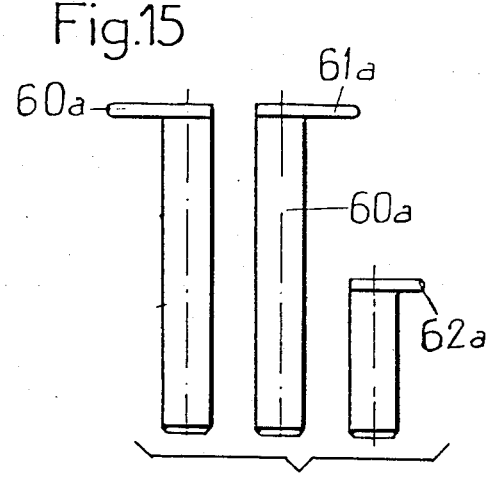
FIG. 15 is an elevation view of another embodiment of a set of three keys.

FIG. 15 shows a set of three keys 60a, 61a, 62a which is different from the preceding set by a greater diameter of the palpation head. It permits verifications of outer and inner grooves.

Figure 16:
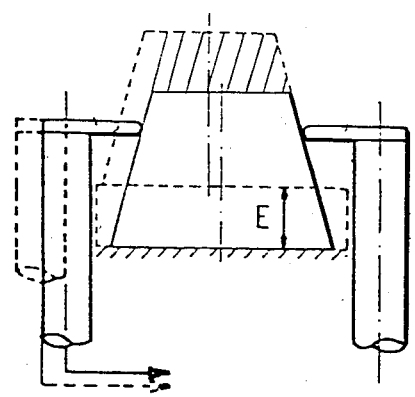
FIG. 16 shows the keys for controlling a conical part.

FIG. 16 shows a verification of the conicity which is made by two successive verifications with and without using a calibration wedge E, by means of the preceding keys 60a, 61a, 62a.

Figure 17:
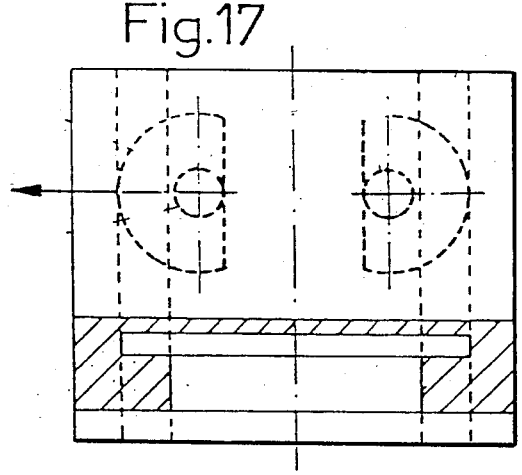
FIG. 17 is a plane view showing the control of a T-shaped linear slot.

FIG. 17 shows a verification of the width of T-shaped linear groove which is made by means of preceding keys.

Figure 18:
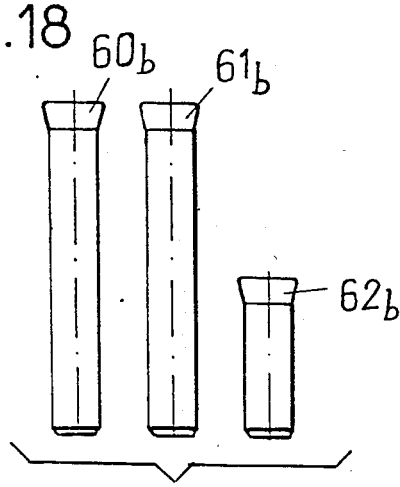
FIG. 18 is an elevation view of a set of keys for recesses of a small depth.

FIG. 18 shows a set of three keys 60b, 61b, 62b which is different from the preceding set by the palpation head which has an inverted truncated shape. It permits verifications of diameters of small depth recesses.

Figure 19:
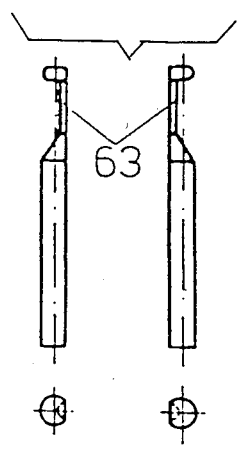
FIG. 19 is a plane-elevation view of two thin keys.

FIG. 19 shows a set of two thin keys which have a collar 63 between the palpation head and the shaft.

Figure 20:
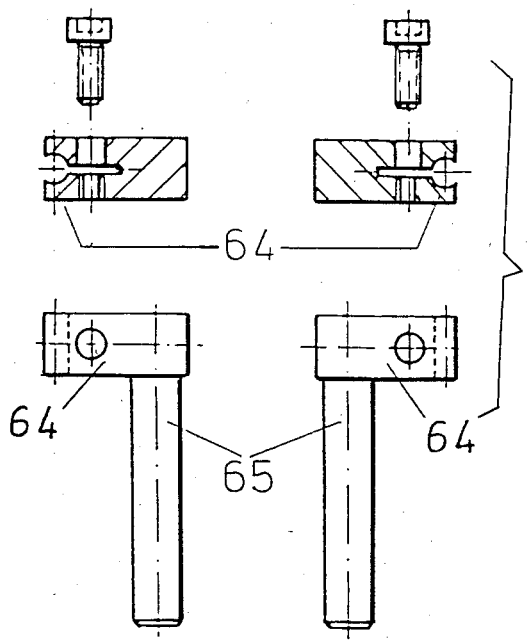
FIG. 20 is an elevation view partly in cross-section of two intermediary supports.
Figure 21:
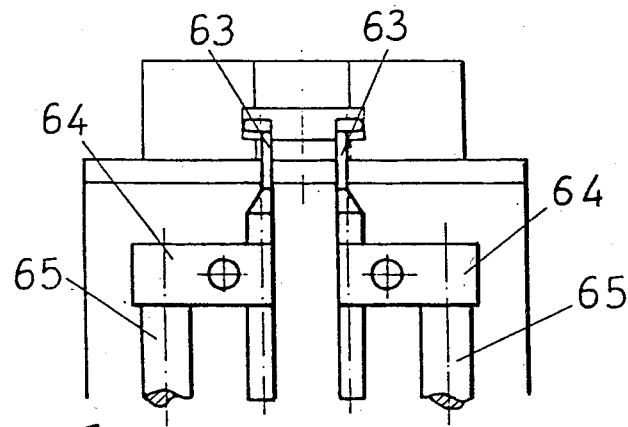
FIGS. 21, 22, 23, 24 are plane-elevation views showing the handling of the thin keys of FIG. 19 mounted on the supports of FIG. 20.
Figure 22:
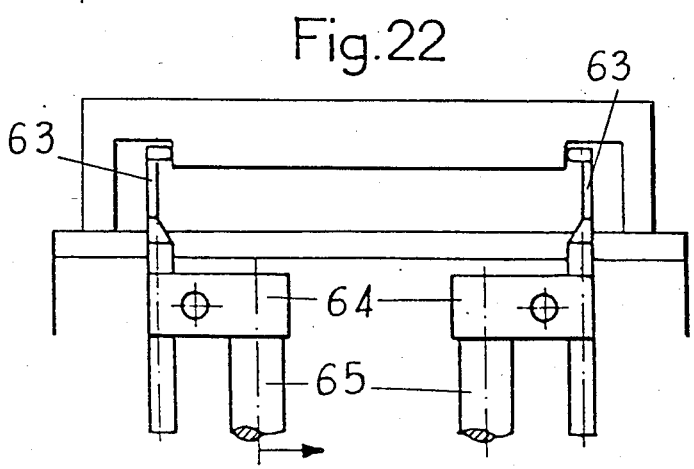
Figure 23:
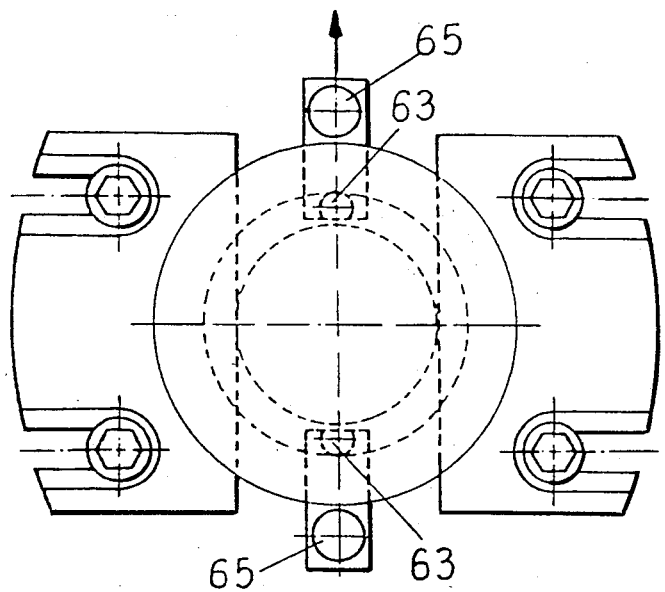
Figure 24:
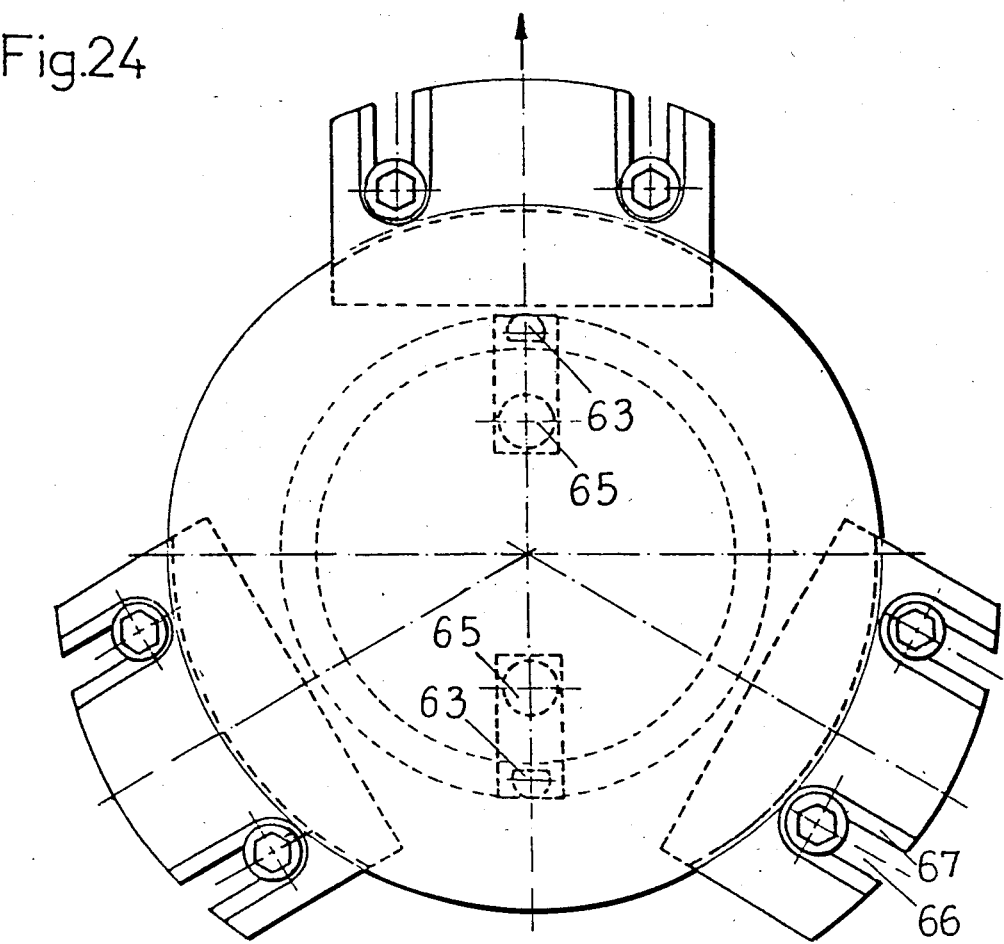

FIG. 20 shows a set of two intermediary support for the above mentioned thin keys, which have a tightening clip 64 for securing a thin key, and a shaft 65 similar to the shaft 60 of FIG. 14. This embodiment permits verifications of diameters and inner grooves of small dimension (FIG. 21), diameters of a difficult access (FIG. 22) and inner or outer diameters of front grooves of small width (FIGS. 23 and 24).

Figure 25:
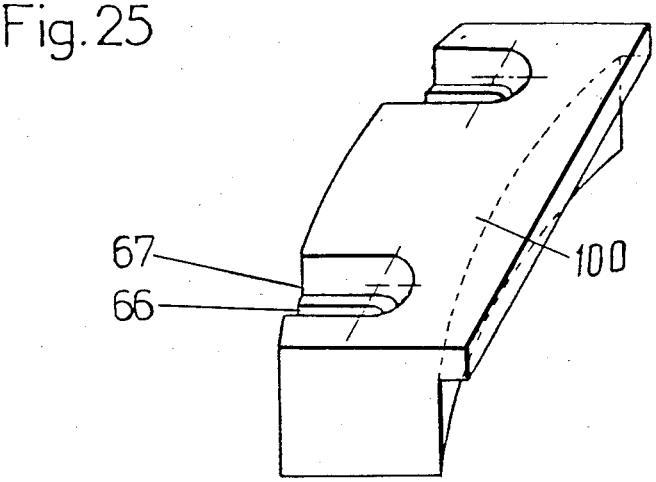
FIG. 25 is a perspective view of one adjustable and removable small table.

FIG. 25 shows a removable and adjustable small table 100 which is screwed on the measuring table 2 in the suitable innerly threaded holes 5, the body of the screws passing in the lower aperture 66 and the head being supported on the shoulder generated by the upper aperture 67 in which it is embedded. Adjustment is made by means of these apertures by moving front or back the small table relatively to the two screws before the locking thereof. These small tables on which is positioned the part to be measured are to be used for the verifications according to FIGS. 21-24.

Figure 26:
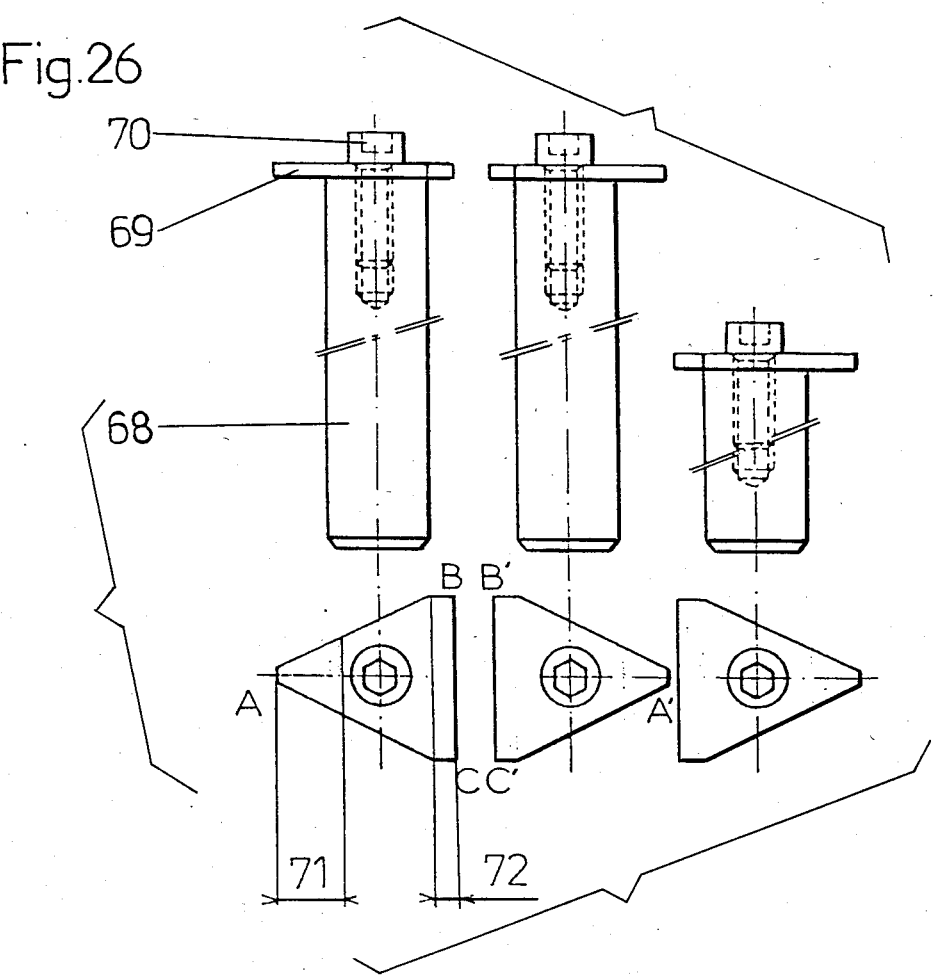
FIG. 26 is a plane-elevation view of a set of keys for a precise verification of flange diameters of threads.

FIG. 26 shows a set of three keys of a new design for the precise verification of the diameters of threaded flanges of inner or outer threads and of the conicity thereof. The keys are each made of a cylindrical shaft 68 (similar to the shaft 60 of FIG. 14) and a palpation head 69 secured to the shaft 68 by a screw 70. The head 69 is in the shape of an isoceles triangle BAC, the thickness of the head 69 being equal to half the pitch of the threading which has to be verified.

Figure 27:
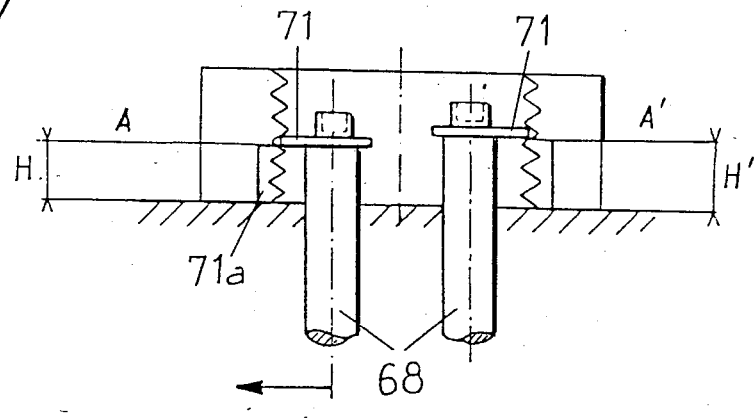
FIG. 27 is an elevation view showing the use of the keys of FIG. 26 for a verification of an inner thread.

FIG. 27 shows a verification of an inner threading which is made in the following way: the two palpation flat parts A and A' having to be perfectly perpendicular to the keys and comparator plane (i.e. the axis AA' in this plane), it is sufficient for adjustment of one of these keys to make the bases BC and B'C' to touch each other, to place a calibration wedge 71a of a height H under its nose 71 and to tighten the screw which locks it on its support. For adjusting the other key, it is sufficient to place its base on any calibration wedge which is itself positioned on the base of the adjusted key, to place a calibration wedge under its nose, of height H' equal to H more or less a half-pitch, and to tighten the screw which locks it on its support.

Figure 28:
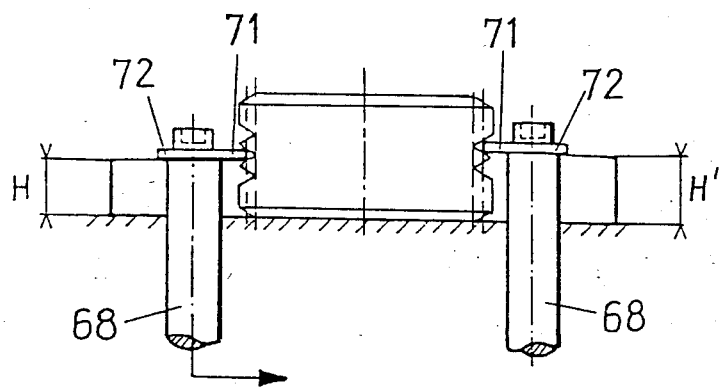
FIG. 28 shows a verification of an outer thread by means of the device of FIG. 27.
Figure 29:
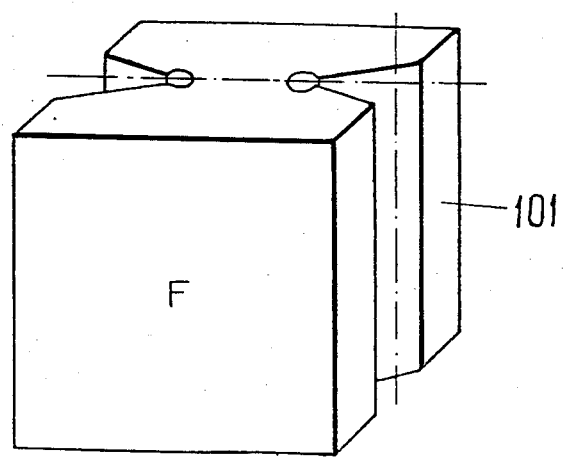
FIG. 29 is a perspective view of a reference block.

FIG. 28 shows a verification of an outer threading which is made in the following way: adjustment of the two keys is made by means of a reference block 101 shown in FIG. 29. The reference block 101 has a perfect parallelepiped rectangle shape with two opposed V-shaped slots and of an angle equal to the angle BAC. It is sufficient for the verification to place the noses of the two keys in the V-shaped slots, to place under a heel 72 of one of the keys a calibration wedge of a height H, and under a heel of the other key a calibration wedge of a height H' (as hereinbefore) and to tighten the screws which lock them on the supports.

Figure 30:
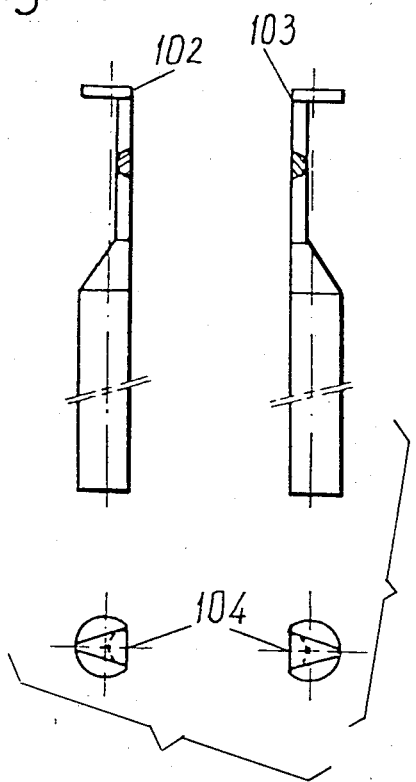
FIG. 30 is a plane-elevation view of another set of keys for a verification of small inner threads.

FIG. 30 shows a set of two keys 102, 103 for verification of inner threadings of small diameters, having the same geometry and dimensions than the thin keys shown in FIG. 19, except that the palpation head have the same features as that of the keys shown in FIG. 26 but without any heel, a longitudinal flat part 104 being used instead of the heel of FIG. 26.

Figure 31:
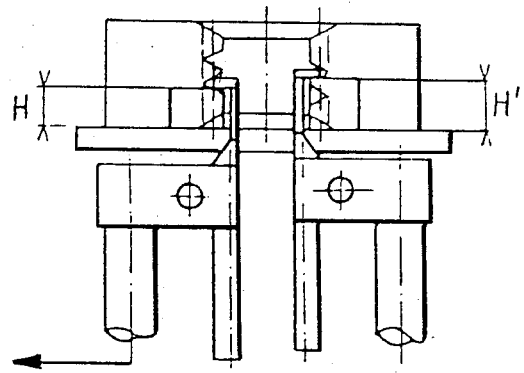
FIG. 31 shows the use of the keys of FIG. 30.

FIG. 31 shows such a verification of an inner threading of a small diameter which is made in the following way: the keys shown in FIG. 30 are mounted on two intermediary supports for thin keys shown in FIG. 20, by placing, the one against the other, their flat parts and under the noses of which are placed two calibration wedges of height respectively H and H' as previously, the part to be verified being positioned on two adjustable and removable small tables shown in FIG. 25.

Figure 32:
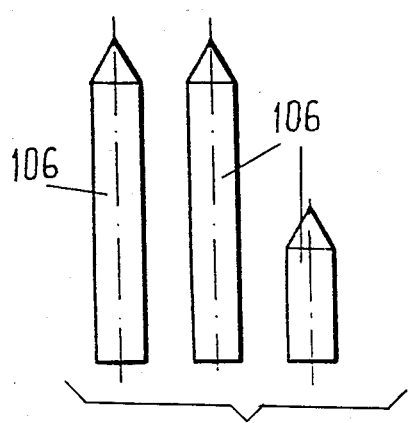
FIG. 32 shows a set of keys for a verification of the distance between axes of two holes.

FIG. 32 shows a set of three keys 106 for the verification of the distance between axis of two holes of diameters smaller than that of the shaft of the keys, whether or not they emerge in the same plane.

Figure 33:
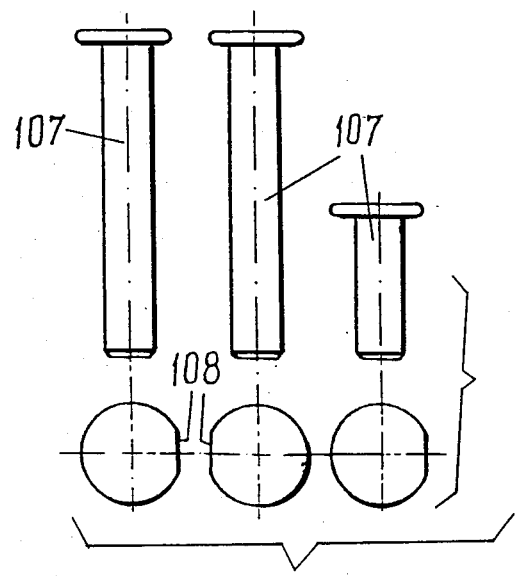
FIG. 33 is a plane-elevation view of the keys for a quick control of an outer diameter.

FIG. 33 shows a set of three keys 107 for a quick verification of outer diameters, the keys 107 differing from the keys shown in FIG. 14 by a smaller flat part 108 of the head, this flat part which is conversely to the latter, the palpation flat part.

Figure 34:
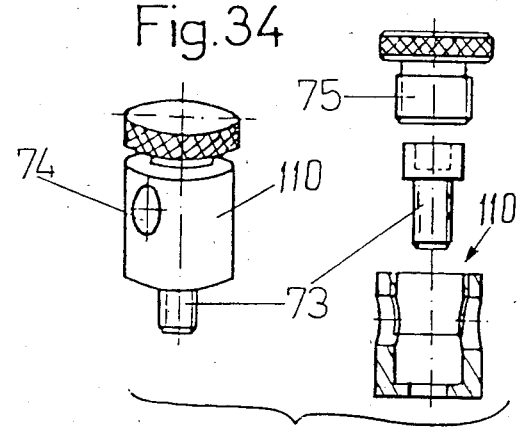
FIG. 34 is an exploded perspective view of an abutment support.

FIG. 34 is an exploded perspective view showing an abutment support 110 which is secured on the measuring table 2 by means of the screw 73 in the suitable innerly threaded hole 5.

Figure 35:
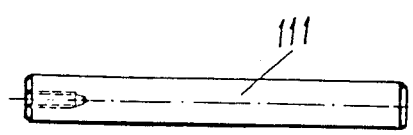
FIG. 35 is an elevation view of an abutment.

FIG. 35 shows the abutment 111 which is mounted in the hole 74 of the above mentioned abutment support where it is locked in the suitable position by the threaded plug 75. The abutment 111 shows at one of its ends an innerly threaded hole provided for receiving a suitable known feeler.

Figure 36:
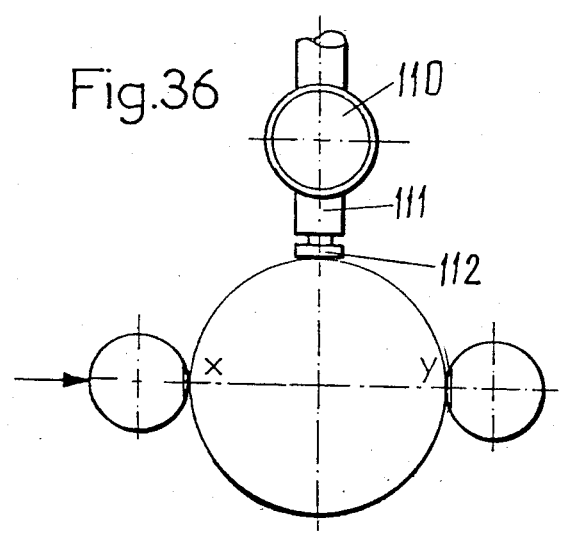
FIG. 36 is a plane view showing a quick verification of outer diameters by means of the abutment of FIG. 35.

FIG. 36 shows a quick verification of the outer diameters, a known flat feeler 112 being mounted on the abutment.

Figure 37:
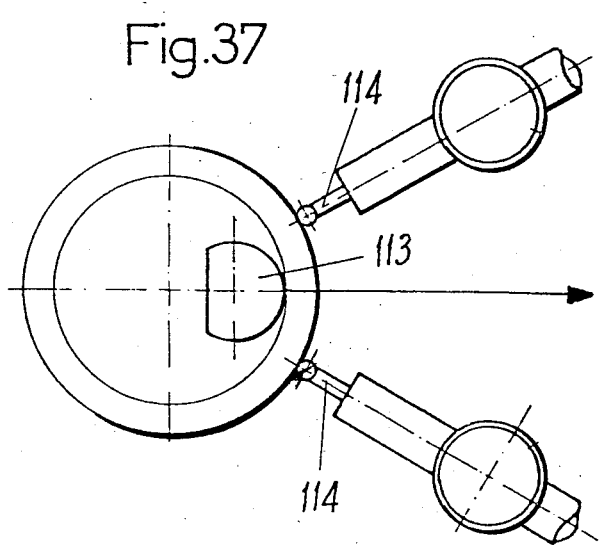
FIG. 37 is a plane view for a verification of a concentricity between an outer diameter and an inner diameter.

FIG. 37 shows a verification of the concentricity of a bore with respect to outer diameter between the mobile key 113 and two known ball feelers 114 mounted on two abutments, the supports of which are secured on the measuring table, symmetrically to the keys and comparator plane.

Figure 38:
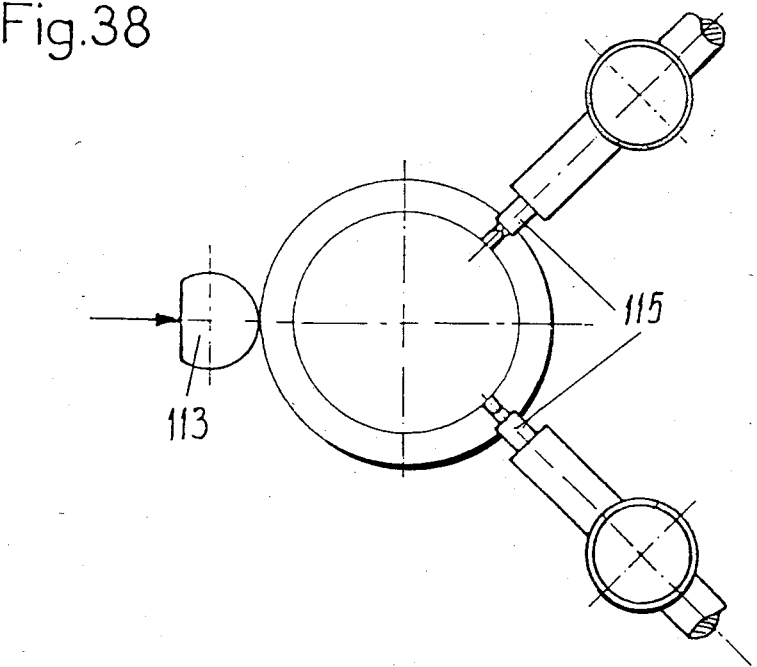
FIG. 38 is a plane view showing a verification of the concentricity between two outer diameters.

FIG. 38 shows a verification of the concentricity between two outer diameters similar to the preceding verification but by using two known bevelled feelers 115.

Figure 39:
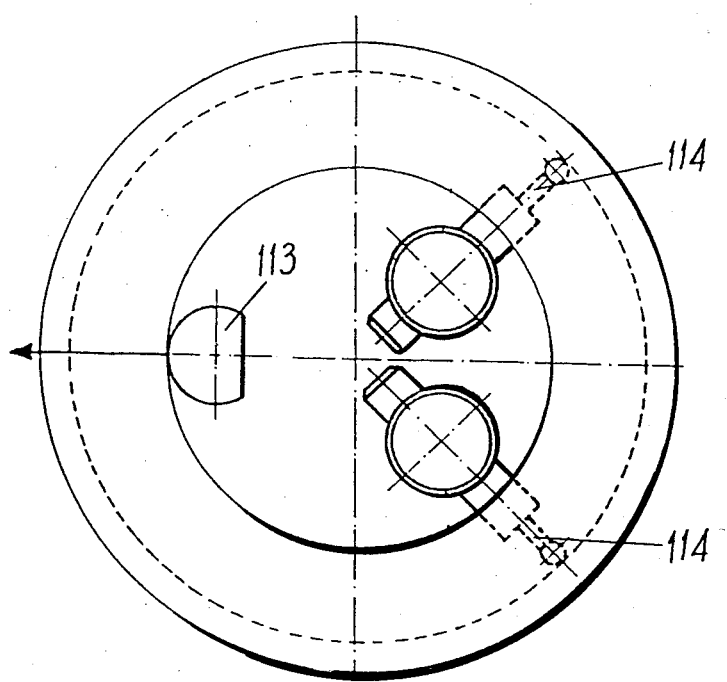
FIG. 39 shows the control of the concentricity between two inner diameters.

FIG. 39 shows a verification of the concentricity between two inner diameters similar to that of FIG. 37 but of opposite direction.

Figure 40:
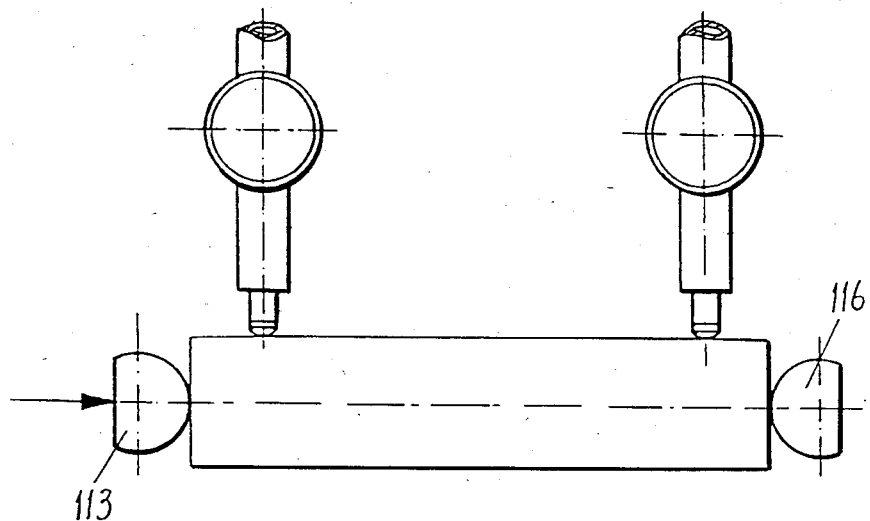
FIG. 40 shows the control in length between two keys.

FIG. 40 shows a verification of lengths between the two keys 113 and 116, the part being supported on two known bulged feelers mounted on two abutments, the support of which are fixed on the measuring table perpendicularly to the keys and comparator plane and at a equal distance of this plane.

Figure 41:
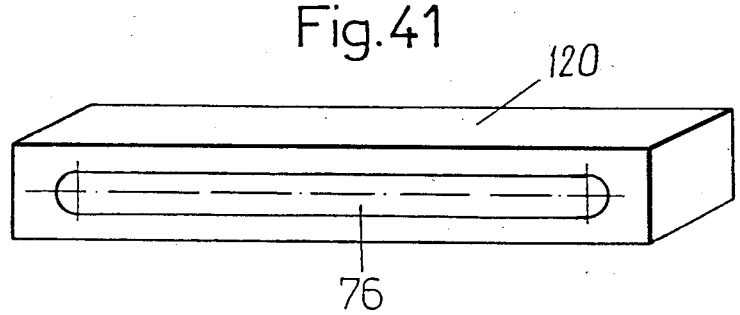
FIG. 41 show a wedge for the support of the part to be verified.

FIG. 41 shows a wedge 120 for the support of the part to be verified. The wedge 120 has a perfect parallelepiped rectangle shape and is made of tempered and rectified steel with an aperture 76 at two parallel sides for passing two screws which will secure the wedge on the measuring table while being mounted in two suitable innerly threaded holes 5.

Figure 42:
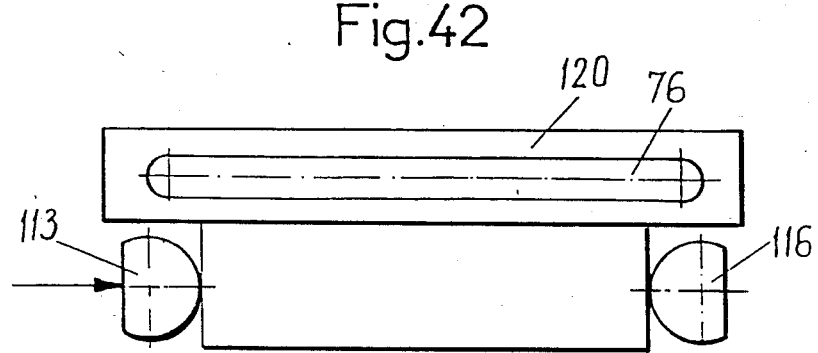
FIG. 42 is a plane view of a second possibility for verifying a length.

FIG. 42 shows a second possibility of the device for verifying the lengths of parts.

FIG. 43 shows how to verify parallelism of a part.

FIG. 44 shows a verification of the thickness of the bottom of linear groove and of its parallelism.

FIG. 45 shows a support for a lengthened fixed key, having the same features as that of FIGS. 3 and 4 enabling to increase the capacity of the verifying apparatus.

Figure 46:
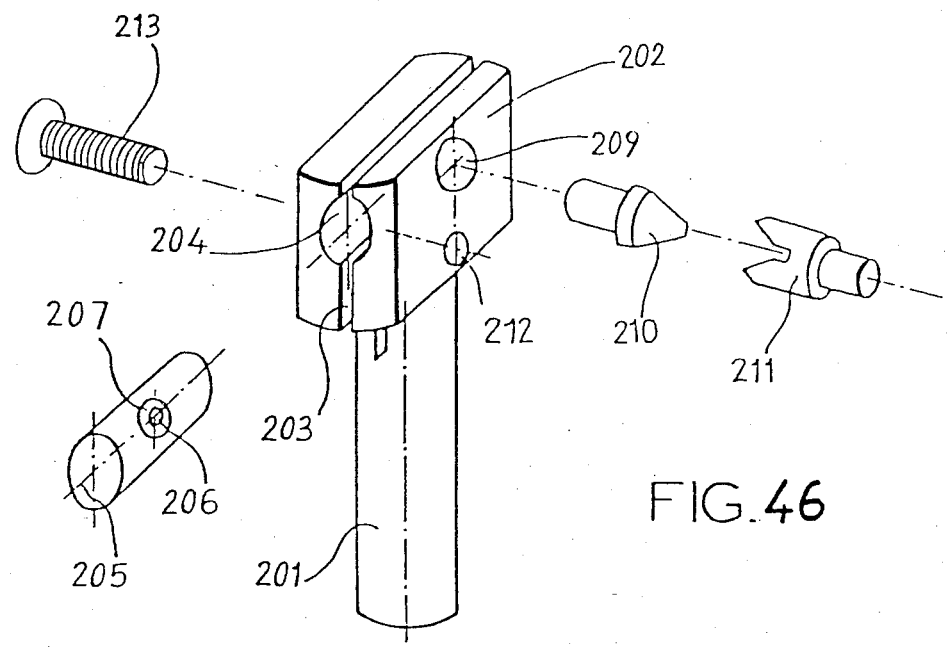
FIG. 46 is a perspective view of a type of key for verifying inner and outer threadings.

In FIG. 46, the shaft 201 is secured on the supports for keys (fixed and mobile) of the gauge table. The head 202 secured to the shaft has a narrow milling 203 which separates it into two parts. A smooth walled hole 204 receives an orientable cylinder 205 which has a hole 206 with a supporting side 207, the hole 206 will come in the axis of the hole 209 of the head. A threading feeler (identical to those mounted on micrometers), i.e. a male feeler 210 or a female feeler 211, is freely mounted without any clearance in the hole 206 and is placed on the side 207 through the hole 209, the diameter of which is largely greater than the feeler for enabling its move with respect to the axis of the orientable cylinder 205. A hole 212 on either side of the head is threaded on one side of the slot, and is smooth on the other side but has a diameter slightly greater than that which is threaded. A screw 213 mounted on the smooth side will then be screwed on the other side for enabling closing of the slots 203 and therefore a locking in the desired position of the cylinder 205.

When it is desired to verify a threading, two keys (FIG. 46) are mounted on the supports for keys of the gauge table; these two keys receive two threading feelers (a male feeler and a female feeler), either inner feelers outwardly turned for verification of inner threadings, or outer feelers inwardly turned for verification of outer threadings.

Figure 47:
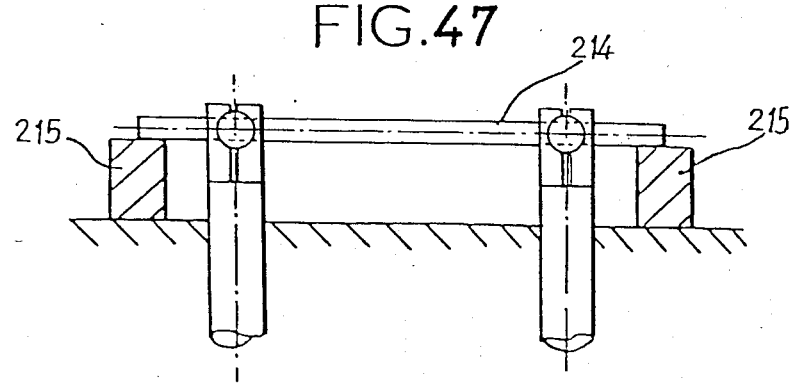
FIG. 47 is an elevation at a reduct scale of the adjusting device of the above keys.

To warrant the quality and the accuracy of these verifications, it is necessary that the two male and female threading feelers be rigourously in the same axis, on the one hand, and that this axis be rigourously parallel to the supporting side of the measuring table, on the other hand. Such a double resultat is easily and rapidly obtained (see FIG. 47) by means of a tempered and rectified pin 214 of a same diameter than the holes 206, which are also tempered and calibrated, by passing through the latter and by being supported on two identical calibration wedges 215 which are suitable for the position of the verification to be made of the part. The two holes 206 of the two orientable cylinders 205 take then the perfect measuring axis which is sufficient to maintain by means, on the one hand, of screws 213 which lock the cylinders 205 and, on the other hand, of locking screws for the keys (which had previously being unlocked) which lock the keys in height on their respective support.

The verification of the inner threading (FIG. 48) is made by comparing with a corresponding threaded ring.

Figure 49:
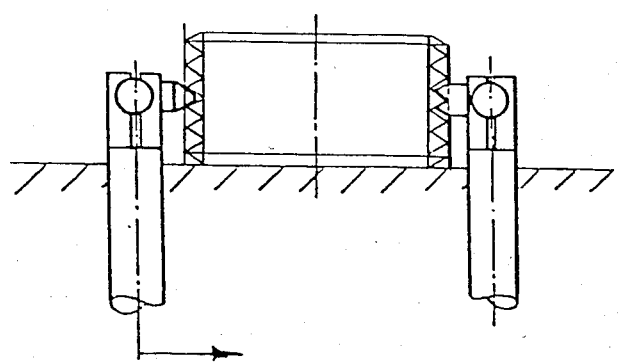

The verification of the outer threading (FIG. 49) is made by comparing with a corresponding threaded gauge.

It is important to notice that:

(1) the verification is identical to that of a flanged thread calliper but with a better accuracy (lower than 1/100 mm), (2) the threaded rings and gauges which are used only once for calibrating the apparatus are not at all work and should be considered as calibrating means.

Figure 50:
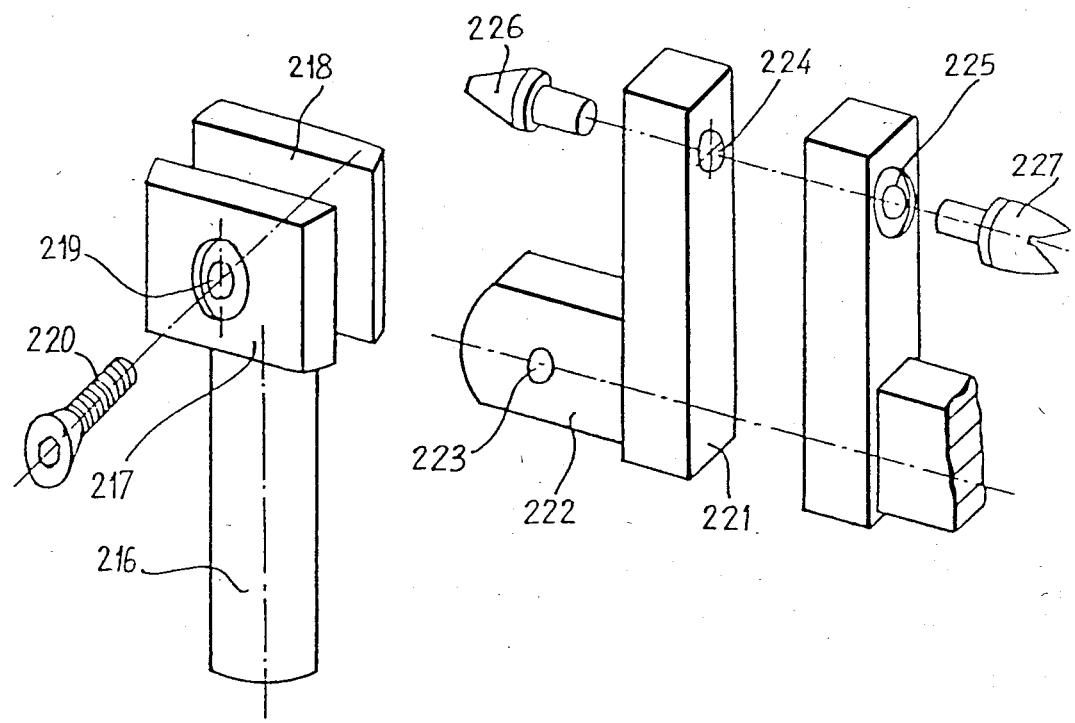
FIG. 50 is a perspective view showing the key used for the verification of inner threading of small diameters.

FIG. 50 shows an embodiment of the type of keys shown in FIG. 46 for a verification of inner threadings of small diameter.

The shaft 216 is secured on supports for fixed and mobile keys of the gauge table. The head 217 fixed to the shaft has a wide milling 218 which separates it into two parts. A hole 219 on either side of the head is smooth on the milling side and threaded on the other side. The diameter of its smooth part is slightly greater than that of its threaded part. A screw 220 mounted on the smooth side will then be screwed on the other side to be used as an articulation axis for the second part forming the key (orientable finger 221) and to permit blocking the key by closing the slot 218.

The orientable finger 221 has a square shape. Its horizontal part 222 provided with a hole 223 for passing the screw 220 can pivot relatively to the screw 220 in the slot 218. Its vertical part, fixed with the horizontal part 222, has at its end a hole 224 which can be shouldered at 225 on the outer side for receiving freely but without any clearance one of the two threading inner feelers, i.e. the male feeler 226 or the female feeler 227.

When it is necessary to verify an inner threading of a small diameter, the supports of the keys of the gauge table receive each one a key (see FIG. 50) in the same manner as previously for the keys (see FIG. 46). There is also proceeded as previously in order that the two inner threadings feelers 226 and 227 are rigorously in the same axis, and that this axis is rigorously parallel to the supporting side of the measuring table, the axis 214 being of a same diameter than the holes 224 passing through them and being supported on two identical calibration wedges. It is in this case sufficient, in order to maintain the holes 224 in the perfect measuring axis, on the one hand, to lock the orientable finger 221 by means of screws 220 and, on the other hand, to lock the keys properly so-called (see FIG. 50) in their respective support.

Figure 48:
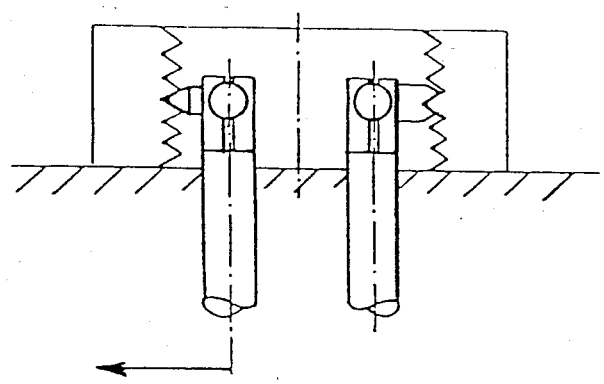
FIGS. 48 and 49 show the keys during the verification of the threading of a nut and the verification of a threaded rod.

A verification of an inner threading of a small diameter (see FIG. 51) is made as in FIG. 48.

The possibilites of the present apparatus are not limited to the twenty five verifications hereinabove mentioned. The plurality of the accessories which have been described and the possibility to design specially provided accessories will actually permit to give a solution to the dimensional verification problem of any part, within the capacity of the gauge table and the palpation sensibility.

What is claimed is:

1. A universal dimensional gauge table for comparatively measuring inner and outer dimensions against a predetermined calibrated, verification of a dimension of a part between a fixed key and a mobile key, comprising:

a body housing a horizontally extensive slide, a support for centering said fixed key within said slide, the lower part of the support having a cross-section in a shape of an inverted isoceles trapezium and lying in said slide of the body, said slide having a recessed cross-section corresponding to the cross-section of the support;

a key wedge for locking the support of the fixed key within said slide, said key wedge having a cylindrical shape with a longitudinal flat part, said support being crossed through by a bore within which is supported said key wedge, and a screw causing said flat part to pivot about its longitudinal axis in said bore by the action of said screw pressing against one side of said flat part, with another side of said flat part being wedged against a lower face of the gauge table;

a square shaped support for supporting said mobile key, the former having a first pin fixed thereto, the body of the gauge table being provided with a second pin, said second pin being parallel to said first pin, a first bearing means carried in the square shaped support with said first bearing means being supported by said second pin, a second and a third bearing means in the body of the gauge table with said second and third bearings means supporting the first pin, whereby the square shaped support, the first pin and the second pin form an assembly for displacing the mobile key toward and away from said fixed key, and providing substantial perpendicularity between the vertical extent of said mobile key and said gauge table and a substantial centering of the mobile key relative to said slide; and wherein two protecting caps are further provided in the body of the gauge table for protecting the first pin at the two ends thereof.

2. The universal dimensional gauge table as set forth in claim 1, comprising a serrated wheel means for effecting displacement of the mobile key, said serrated wheel means protruding outwardly from the body of the gauge table and having two vertical shoulders, an upper shoulders of said serrated wheel being surrounded by a coiled spring having a vertical lower end which is located in a hole of the serrated wheel means and a horizontal upper end which passes through a hole in a free driving washer having an axis fixed to the support of the mobile key.

3. The universal dimension gauge table as set forth in claim 2, wherein for a palpation pressure adjustment of the mobile key, the coiled spring rotates progressively in one direction when the serrated wheel means is progressively rotated in the same direction and rotates progressively in an opposite direction.

4. The universal dimension gauge table as set forth in claim 2, wherein a ball is located in a hole of the body of the gauge table for locking the serrated wheel means between an upper side of said serrated wheel means and one end of a needle-screw which is screwed outwardly of the body of the gauge table.

5. The universal dimensional gauge table as set forth in claim 1, comprising a handling means for the mobile key, said handling means comprising a handling finger protruding outwardly from the body of the gauge table, a pivotally mounted fork connected to said handling finger and rotating in either of two directions by acting on said handling finger and, means engaged with said fork and connected to the support of the mobile key, whereby movement on said handling finger displaces linearly the support of the mobile key (FIGS. 12, 13).

6. The universal dimensional gauge table as set forth in claim 5, wherein said pivotally mounted fork comprises an upper side with two diametrically opposite, symmetrically arcuate grooves, symmetrical with respect to the handling finger and having a depth increasing from said handling finger to an end of said fork, and two needle-screws being screwed outwardly of the body of the gauge table for acting respectively on two balls, with one ball being placed in each of said arcuate groves, whereby the rotation of the fork in opposite directions is limited and an adjustment of the mobile key is facilitated (FIG. 12).

7. The universal dimensional guage table as set forther in claim 5, wherein said pivotally mounted fork comprises an upper side provided with an upstanding, semi-circular collar having its two ends symmetrical with respect to the handling finger, and two needle screws being screwed outwardly of the body of the gauge table for acting respectively on the two ends of said semi-collar, whereby the rotation of the fork in opposite directions is limited and an adjustment of the mobile key is facilitated (FIG. 13).

8. The universal dimensional gauge table as set forth in claim 1, wherein, for measuring inner and outer threadings, the fixed key and the mobile key have each a palpation head with two sides in a shape of an isoceles triangle, a thickness equal to half a pitch of the threading, and front and rear edges parallel therebetween, the front edge being provided with a flat part, the front and rear edges of said fixed and mobile keys being parallel to one another.

9. The universal dimensional gauge table as set forth in claim 8, wherein for measuring an inner threading there is provided first and second calibration wedges having respective heights differing by half a pitch of the threading and placed respectively and successively under the front edges of the two keys, after being assured, for adjustment of a first of the two keys, that the rear edges of the two keys are touching together.

10. The universal dimensional gauge table as set forth in claim 8, wherein for measuring an outer threading, there is provided a reference block of a parallelepiped rectangle shape having two opposed V-shaped slots of an angle equal to that of the front edges of the two keys and in which said front edges are placed, and a first and a second calibration wedges having a height differing by half a pitch of the threading and placed under the rear edges of the two keys.

11. The universal dimensional gauge table as set forth in claim 1, wherein for measuring an inner threading of small diameter, there is provided two thin keys mounted on two intermediary supports and two adjustable removable small tables secured on top of the gauge table.

12. The universal dimensional gauge table as set forth in claim 1, wherein, for verification of parts of small dimensions, removable small tables are screwed on top of the gauge table by means of screws in suitable innerly threaded holes, said screws having a body passing through a lower aperture and a head supported on a shoulder generated by an upper aperture in which said head is embedded.

13. The universal dimensional gauge table as set forth in claim 1, wherein each of the two keys has a stem with a head having a slot and a hole in which can pivot an orientable cylinder, said orientable cylinder having a support face centrally provided with a hole in order to freely receive with no clearance a male and respectively a female threading feeler through a hole of a greater diameter.

14. The universal dimensional gauge table as set forth in claim 13, further comprising a pin of a same diameter than the hole in the orientable cylinder, said pin passing through said hole and being supported on two identical calibration wedges, whereby enabling an adjustment for placing in a same axis the male and female threading feelers and in a plane parallel to top of the gauge table, and there is further provided adjustment means comprising screws for locking each orientable cylinder, and screws for supporting the keys and locking the keys in height (FIGS. 46–49).

15. The universal dimensional gauge table as set forth in claim 1, wherein each of the two keys has a stem with a head having a slot, an angle shaped part having two arms, one arm of said angle shaped part being pivotally engageable into said slot, the other arm of said angle shaped part being provided with a hole in order to freely receive with no clearance a male and respectively a female threading feeler.

Figure 51:
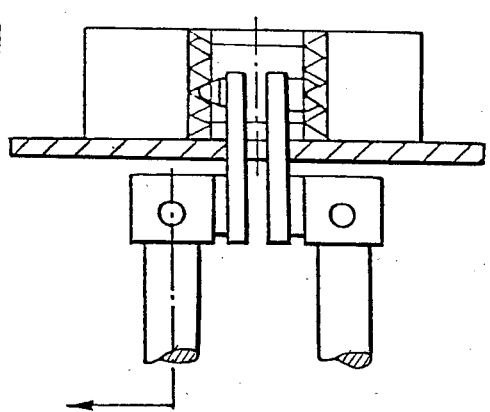
FIG. 51 shows the verification of threadings of a nut of a small diameter.

16. The universal dimensional gauge table as set forth in claim 15, further comprising a pin of a same diameter than said hole, said pin passing through said hole and being supported on two identical calibrated wedges, whereby enabling an adjustment for placing in a same axis the male and female threading feelers and in a plane parallel to top of the gauge table, and there is further provided adjustment means comprising screws for locking each angle shaped part, and screws for supporting the keys and locking the keys in height (FIGS. 50–51).

17. The universal dimensional gauge table as set forth in claim 1, wherein a calibration enabling a verification of threadings is made through known threaded plugs for outer threadings and by means of known threaded rings for inner threadings.

* * * * *